US011468624B1

(12) United States Patent
Cunningham et al.

(10) Patent No.: US 11,468,624 B1
(45) Date of Patent: Oct. 11, 2022

(54) HEAVY EQUIPMENT PLACEMENT WITHIN A VIRTUAL CONSTRUCTION MODEL AND WORK PACKAGE INTEGRATION

(71) Applicant: Bentley Systems, Incorporated, Exton, PA (US)

(72) Inventors: Jonathan Cunningham, Calgary (CA); Gary Orton, Vancouver (CA); Ryan Posnikoff, Vernon (CA); Graham Lee, Manchester (GB); Richard Dean Bowman, Fernandina Beach, FL (US)

(73) Assignee: Bentley Systems, Incorporated, Exton, PA (US)

( * ) Notice: Subject to any disclaimer, the term of this patent is extended or adjusted under 35 U.S.C. 154(b) by 35 days.

(21) Appl. No.: 17/075,308

(22) Filed: Oct. 20, 2020

Related U.S. Application Data

(60) Provisional application No. 62/924,167, filed on Oct. 21, 2019.

(51) Int. Cl.
*G06T 15/08* (2011.01)
*G06T 17/10* (2006.01)
*G06T 15/00* (2011.01)
*G06T 15/10* (2011.01)

(52) U.S. Cl.
CPC ............ *G06T 15/08* (2013.01); *G06T 15/005* (2013.01); *G06T 15/10* (2013.01); *G06T 17/10* (2013.01)

(58) Field of Classification Search
CPC ................................. G06T 15/08; G06T 19/20
See application file for complete search history.

(56) References Cited

U.S. PATENT DOCUMENTS

| 8,485,822 | B2 | 7/2013 | Lind |
| 9,177,085 | B2 | 11/2015 | Snyder et al. |
| 10,755,484 | B1 | 8/2020 | Côté |
| 2013/0013251 | A1* | 1/2013 | Schoonmaker ......... B66C 15/04 |
| | | | 702/152 |
| 2013/0024245 | A1 | 1/2013 | Nichols et al. |

(Continued)

OTHER PUBLICATIONS

"ConstructSim Work Package Server," Product Data Sheet, CONNECT Edition, Bentley Systems, Incorporated, Mar. 20, 2016, pp. 1-2.

(Continued)

*Primary Examiner* — Phi Hoang
(74) *Attorney, Agent, or Firm* — Cesari and McKenna, LLP; James A. Blanchette

(57) ABSTRACT

In example embodiments, techniques are provided for integrating pieces of heavy equipment into a virtual construction modeling workflow by including representations of the pieces of the heavy equipment in a 3D environment of a virtual construction model, evaluating capabilities and clashes in the context of the 3D environment, and adding descriptions of the pieces of heavy equipment and operational details to work packages. Each piece of heavy equipment is associated with a unique ID, an effective range (e.g., lifting radius) and other parameters. Using a client the user links the piece of heavy equipment to one or more work packages by associating its unique ID with the work package. The work package is associated with a physical extent in the virtual construction model which falls within the effective range of the equipment. Operational details (e.g., scheduling, cost, usage rates, maintenance, etc.) are defined in connection with the work package.

20 Claims, 10 Drawing Sheets

(56) References Cited

U.S. PATENT DOCUMENTS

| | | | |
|---|---|---|---|
| 2014/0200863 A1 | 7/2014 | Kamat et al. | |
| 2016/0035251 A1* | 2/2016 | Delplace | G09B 5/065 |
| | | | 434/66 |
| 2017/0073197 A1 | 3/2017 | Morath et al. | |
| 2019/0077639 A1* | 3/2019 | Hofmeister | B66C 23/88 |
| 2019/0094834 A1* | 3/2019 | Bramberger | G06Q 50/08 |
| 2019/0146448 A1 | 5/2019 | Lee et al. | |
| 2021/0072727 A1* | 3/2021 | Stanger | E02F 9/265 |
| 2021/0221654 A1* | 7/2021 | Yodawara | B66C 13/46 |

OTHER PUBLICATIONS

Shariatzadeh, N., et al., "Software Evaluation Criteria for Rapid Factory Layout Planning, Design and Simulation," Elsevier B.V., SciVerse ScienceDirect, Procedia CIRP, No. 3, 45$^{th}$ CIRP Conference on Manufacturing Systems 2012, Dec. 2012, pp. 299-304.

* cited by examiner

HEAVY EQUIPMENT PLACEMENT WITHIN A VIRTUAL CONSTRUCTION MODEL AND WORK PACKAGE INTEGRATION

RELATED APPLICATIONS

This application claims the benefit of U.S. Provisional Patent Application No. 62/924,167, the contents of which are incorporated herein by reference in their entirety.

BACKGROUND

Technical Field

The present disclosure relates generally to virtual construction modeling, and more specifically to techniques for integrating pieces of heavy equipment into a virtual construction modelling workflow.

Background Information

A variety of types of heavy equipment (e.g., cranes, aerial work platforms, air compressors, welding machines, light plants, generators, etc.) are typically used in the construction and/or maintenance of infrastructure (e.g., buildings, plants, roads, railways, bridges, pipe networks, electrical and communication networks, etc.). A number of decisions generally must be made regarding the placement, scheduling and operational details of such equipment. However, such decisions are often made in an inefficient manner. Traditionally, individual construction companies or shops have manually managed placement of pieces of heavy equipment and related working zones (e.g., material lift stage points, access routes, fuel routes, etc.), and operational details (e.g., scheduling, cost, usage rates, maintenance, release from service dates, etc.), using various ad-hoc spreadsheets and documents. While there may be a three-dimensional (3D) computer aided design (CAD) model of the infrastructure project (e.g., an infrastructure model), representations of heavy equipment and their placement are typically not integrated into such model. Likewise, while workforce planning and work packaging software may be used in connection with the infrastructure project, heavy equipment is typically not included in work packages. Often, field personnel have to manually track and coordinate scheduling and operational details. While operable, such techniques are highly labor intensive, requiring significant person-hours for manual data entry, calculation and scheduling. Likewise, such techniques are highly error prone.

Accordingly, there is a need for techniques that may integrate pieces of heavy equipment into a virtual construction modeling workflow.

SUMMARY

In example embodiments, techniques are provided for integrating pieces of heavy equipment (e.g., cranes, aerial work platforms, air compressors, welding machines, light plants, generators, etc.) into a virtual construction modeling workflow by including representations of the pieces of the heavy equipment in a three-dimensional (3D) environment of a virtual construction model, evaluating capabilities and clashes in the context of the 3D environment, and adding descriptions of the pieces of heavy equipment and operational details to work packages. Each piece of heavy equipment is associated with a unique identifier (ID), an effective range (e.g., a lifting radius) and other parameters (e.g., weight limit, cost, maintenance schedule, fuel requirement, early/late release from service date, etc.). At least some of the parameters may be obtained from a 3D model of the equipment. A client software application may utilize the parameters, together with descriptions of working zones (e.g., material lift stage points, access routes, etc.) and characteristics of infrastructure components (e.g., weights, volumes, etc.) included in the virtual construction model to automatically suggest an appropriate piece of heavy equipment to the user, one or more placement locations, as well as to detect clashes (e.g., equipment-on-equipment clashes, equipment-on-structure clashes, etc.). A variety of views of the piece of heavy equipment may be provided by the client to the user that include useful visualizations (e.g., visualizations of total travel path, debris, clashes, equipment-to-equipment support access reach, equipment movement, etc.). Using the client, the user may link the piece of heavy equipment to one or more work packages by associating its unique ID with the work package. The work package may have an extent in the virtual construction model which falls within the effective range (e.g., a lifting radius) of the equipment. Operational details (e.g., scheduling, cost, usage rates, maintenance, etc.) may be defined in connection with the work package. In some embodiments, the work package may be represented (e.g., as a 2D artifact) in a view (e.g., a 2D or 3D map or document). In response to selecting this representation (e.g., 2D artifact), details of the work package may be provided.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "infrastructure" refers to a physical structure or object that has been built, or is planned to be built, in the real-world. Examples of infrastructure include buildings, plants, roads, railways, bridges, pipe networks, electrical and communication networks, etc.

As used herein, the term "infrastructure model" refers to a three-dimensional (3D) representation of physical characteristics of infrastructure.

As used herein the term "virtual construction model" refers to a model that aggregates construction data from a plurality of sources related to work being performed on infrastructure. A virtual construction model typically includes representations of physical characteristics of infrastructure, as well as engineering, scheduling, materials management, labor, and/or other types of data.

As used herein the term "work package" refers to a data structure that defines a crew-level unit of work over a period of time (e.g., one or two weeks) in the construction of infrastructure, including descriptions of work scope, materials, labor and/or other type of data. Typically, a work package is made up of components organized in a sequence.

As user herein the term "heavy equipment" refers to vehicles and machines specially designed for executing construction tasks. Heavy equipment often, but not always, includes equipment systems for implementation, traction, structure, power train, control and information. Examples of heavy equipment include cranes, aerial work platforms, air compressors, welding machines, light plants, generators, etc.

Example Embodiments

Figure 1:
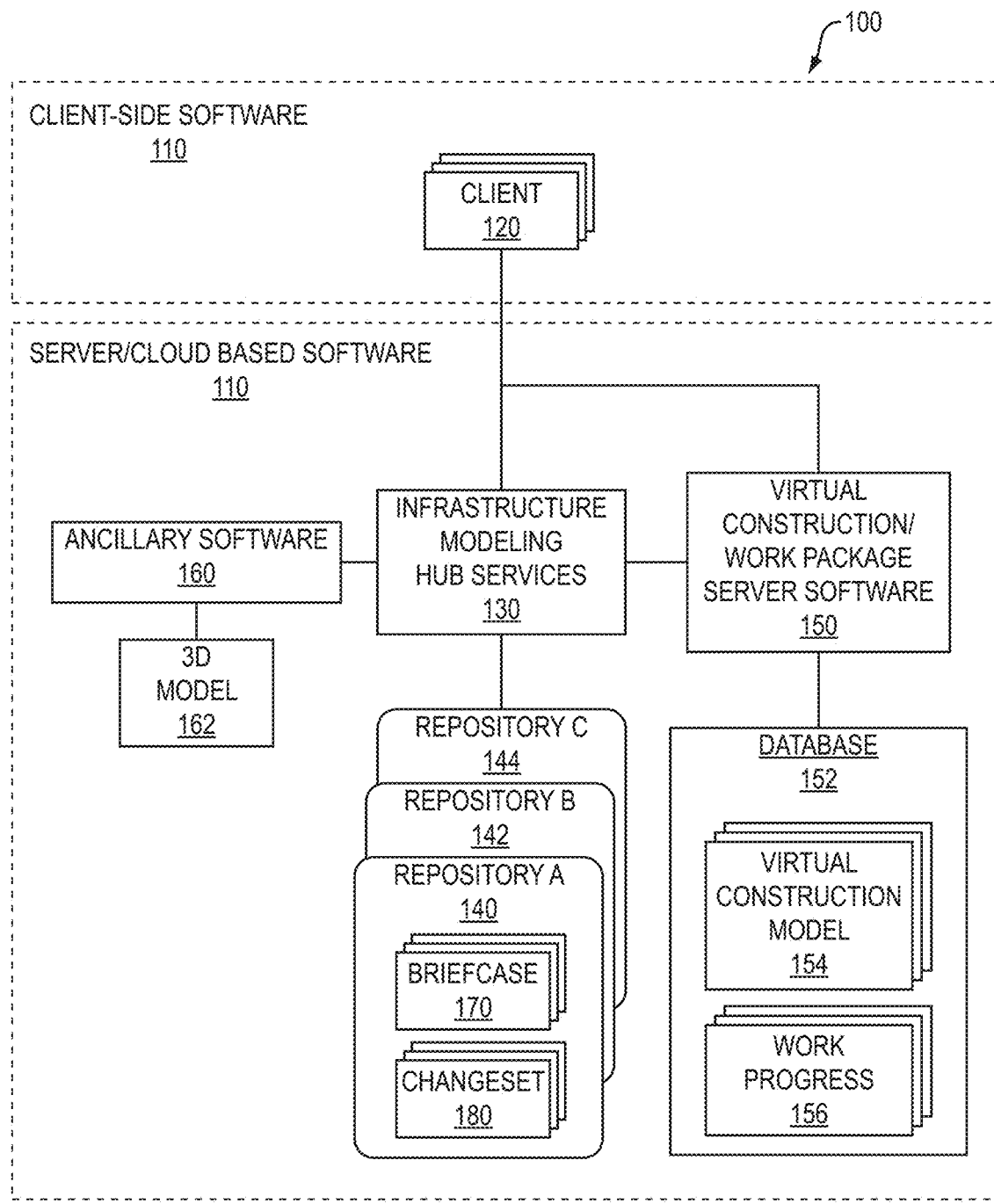
FIG. 1 is a high-level block diagram of at least a portion of an example software architecture.

FIG. 1 is a high-level block diagram of at least a portion of an example software architecture. The architecture may be divided into client-side software 110 executing on one more or more computing devices arranged locally to an end user (collectively "client devices"), and server/cloud-based software 112 executing on one or more remote computing devices ("remote computing devices") accessible over a local area network (LAN) or the Internet.

The client-side software 110 may include client software applications (or simply "clients") 120 operated by end users. The clients 120 may be of various types, including desktop clients that operate directly under an operating system of a client device and web-based clients that operate within a web browser. The desktop clients may include a planning application for interacting with a virtual construction model and work packages (e.g., the ConstructSim™ Planner application), a workflow execution engine and associated utilities application for interacting with a virtual construction model and work packages (e.g., the ConstructSim™ Executive client) and a bridge application for importing information from infrastructure models (e.g., iModel® models) for use in building virtual construction models (e.g., ConstructSim™ iModel® Mapper). The web-based clients may include a web interface for interacting with server/cloud-based software 112 (e.g., the ConstructSim™ Work Package Server web site) to access a virtual construction model and work packages.

The server/cloud-based software 112 may include infrastructure modeling hub services (e.g., iModelHub™ services) 130 that manage repositories 140-144 that maintain infrastructure models (e.g., iModel® models), virtual construction model/work package server software (e.g., the ConstructSim™ Work Packager sever) 150 that maintains a database 152 that include virtual construction models 154 and work packages 156, and ancillary software 160 that maintains data describing pieces of heavy equipment include 3D models 162 thereof.

An infrastructure model may be formed from briefcases 170 and accepted changesets 180. A briefcase 170 is a particular instance of a database that represents a materialized view of the information of a specific version of the model. Over time the baseline briefcase may be modified with changesets 180, which are persistent electronic records that capture changes needed to transform a particular instance from one version to a new version. When a client 120 desires to access an infrastructure model, for example a bridge application that desires to import information from an infrastructure model (e.g., iModel® model) for use in building a virtual construction model, it may obtain the briefcase 170 from a repository 140-144 closest to the desired state and those accepted changesets 180 from the repository 140-144 that when applied bring that briefcase up to the desired state.

A virtual construction model 154 may utilize a 3D environment generated from an infrastructure model as a backbone to store information from a variety of sources that describe engineering, scheduling, materials management, labor, and/or other aspects or requirements for a project. Using the information in a virtual construction model 154, a client 120 in coordination with virtual construction model/work package server software 150 may create work packages 156 that define a crew-level unit of work over a period of time (e.g., one or two weeks) in the construction of infrastructure, including descriptions of work scope, materials, labor and/or other type of data. Work packages 156 may include a number of different types, including Construction Work Packages (CWPs), Installation Work Package (IWPs) and Test Work Package (TWPs).

Figure 2:
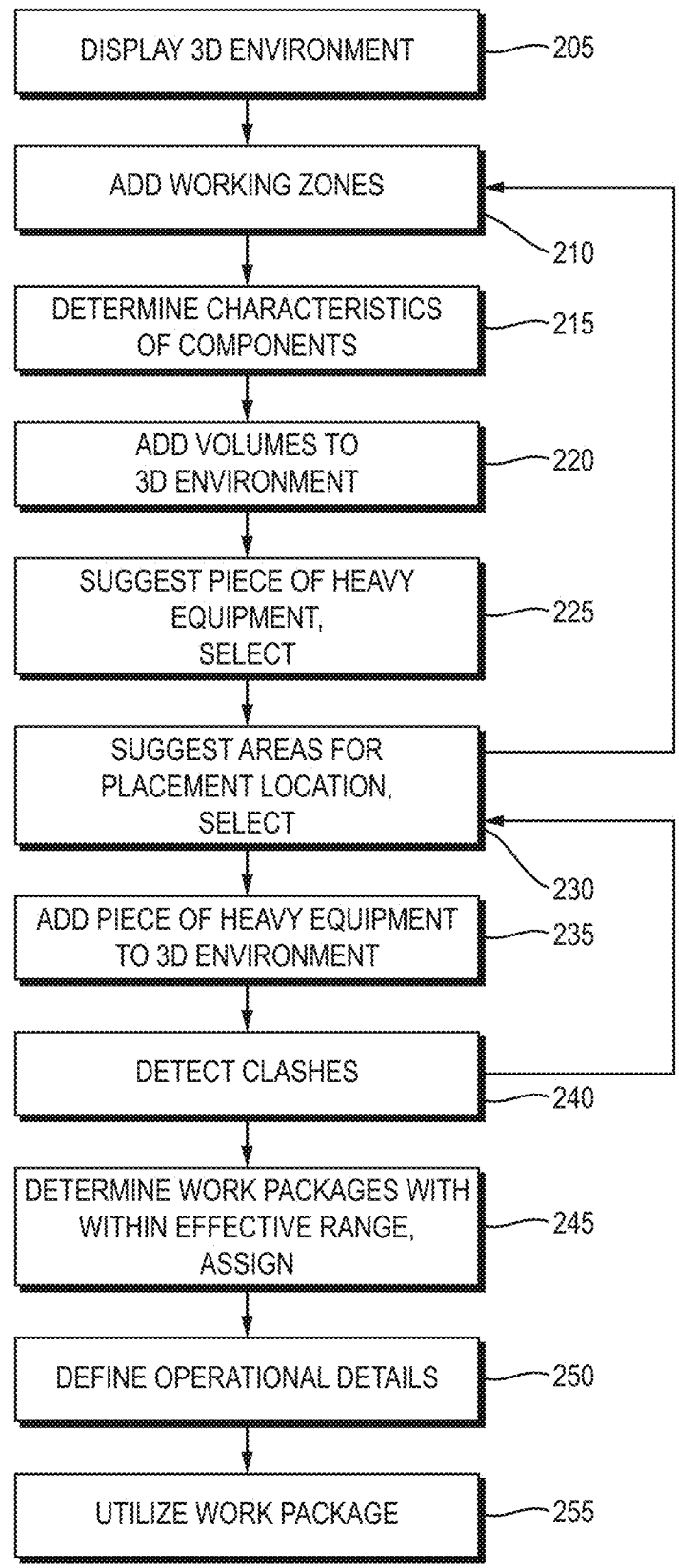
FIG. 2 is a flow diagram of an example sequence of steps for integrating pieces of heavy equipment into a virtual construction modeling workflow.

FIG. 2 is a flow diagram of an example sequence of steps for integrating a piece of heavy equipment into a virtual construction modeling workflow. At step 205, a client 120 displays a 3D environment of the virtual construction model 154. The 3D environment may have been previously generated from an infrastructure model. At step 210, in response to user input in its user interface, the client 120 adds a description of one or more working zones to the 3D environment. In an example embodiment, the piece of heavy equipment may be a crane or aerial work platform, in which case the working zones may include a material lift stage point/material laydown area and a material lift to point. At step 215, the client 120 determines one or more characteristics of components of infrastructure in the virtual construction model 154. The characteristics may be determined by accessing information stored in the virtual construction model 154 (e.g., previously derived from an infrastructure model) or by manual entry in the user interface of the client 120. In an example embodiment, characteristics may include component weights from which a heaviest component weight may be observed and component sizes (e.g., length, width, and height). At step 220, based the characteristics (e.g., component sizes), the client 120 adds one or more volumes to the 3D environment representing components manipulated (e.g., at the material lift stage point). As part of step 220, the client 120 may utilize the volumes to detect clashes caused by the volumes.

At step 225, based on the description of one or more working zones (e.g., the material lift stage point/material laydown area and a material lift to point), the characteristics of components (e.g., heaviest component weight), and parameters of a plurality of potential pieces of heavy equipment (e.g., effective range including lifting radius, weight limit, cost, maintenance schedule, fuel requirement, early/late release from service date, etc.) the client 120 suggests in its user interface for final selection by a user a piece of heavy equipment that has the needed capabilities. Each piece of heavy equipment may be associated with a unique ID. At least some of the parameters of pieces of heavy equipment may be obtained from 3D models 162, to avoid the need for manual user entry. Pieces of heavy equipment that have been already scheduled for use in other tasks in one or more work packages 156 may be omitted (e.g., grayed out in the user interface).

At step 230, the client 120 suggests in its user interface a plurality of areas to use as placement locations (e.g., front, back, left and right drop points) based on the selected piece of heavy equipment and its parameters, working zones and component characteristics, for final selection by the user. As part of step 230, the client 120 may detect clashes caused by the piece of heavy equipment itself and areas that cause clashes may be omitted (e.g., grayed out in the user interface). This may prompt a user to change the descriptions of working zones (e.g., move a material lift stage point), and execution may loop back to step 210. At step 235, the client 120 adds a representation of the selected piece of heavy equipment into the 3D environment of the virtual construction model 154 at the placement location. As part of step 235, the client 120 may display in its user interface a variety of views of the piece of heavy equipment in the 3D environment that provide a variety of useful visualizations, including visualizations of total travel path, debris, clashes, equipment-to-equipment support access reach, equipment movement, etc.).

At step 240, the client uses at least the placement location and the parameters of the piece of heavy equipment (e.g., effective range including lifting radius) to detect clashes caused by operation of the piece of heavy equipment (e.g., including equipment-to-equipment and equipment-to-structure clashes). This may prompt a user to change the placement location and execution may loop back to step 230. At step 245, the client 120 determines one or more work packages 156 having an extent that falls within the effective range about the placement location, and at least one is selected to add the piece of heavy equipment to (e.g., in response to user input in its user interface). In response to such selection, the client 120 links the piece of heavy equipment to the work package 156 by associating its unique ID with the work package 156. As part of step 250, operational details of the piece of heavy equipment may be defined, including scheduling, cost, usage rates, maintenance, release from service dates, and the like. Further, one or more views of the 3D environment showing the placement location may be added to the package 156. At step 255, the work package 156 is utilized. Such utilization may include displaying the work package in the user interface of the client 120, storing the work package to remote/cloud-based virtual construction model/work package server software 150, and ultimately providing the work package to a work crew for implementation in the actual infrastructure project.

Figure 3:
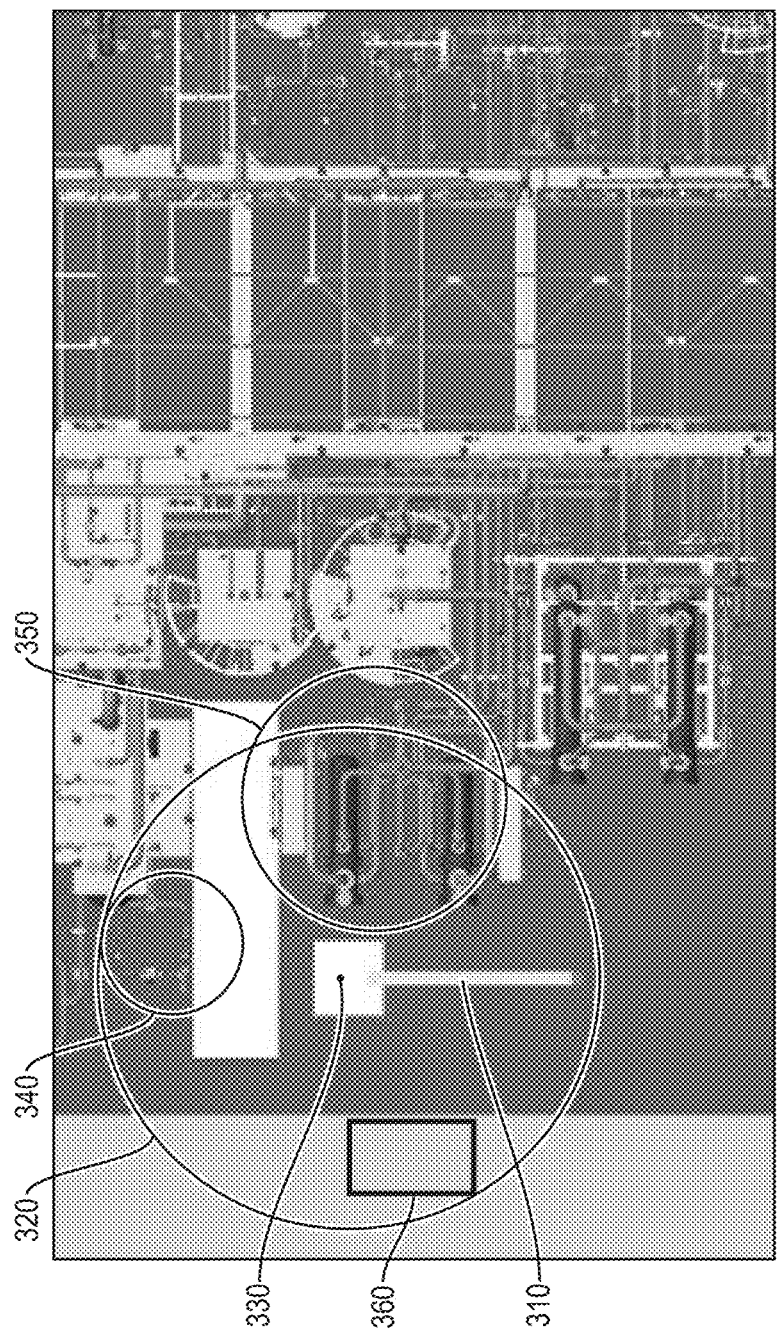
FIG. 3 is an overhead view for an embodiment involving a crane, providing a visualization of effective range (e.g., lifting radius) about a placement location and the extent of work packages.
Figure 4:
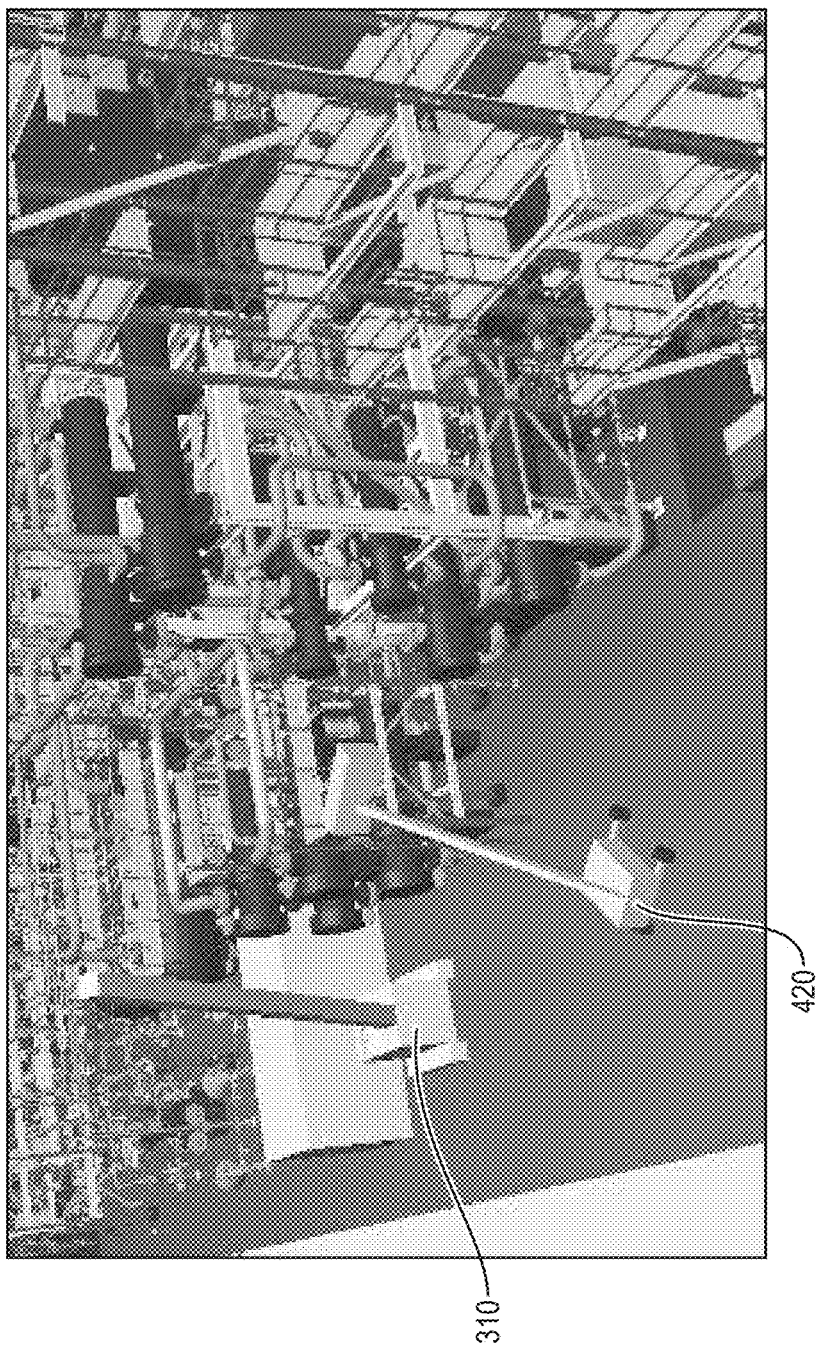
FIG. 4 is a perspective view for an embodiment involving a crane and an aerial work platform, providing a visualization of interaction among pieces of heavy equipment including those that effect access management.
Figure 5:
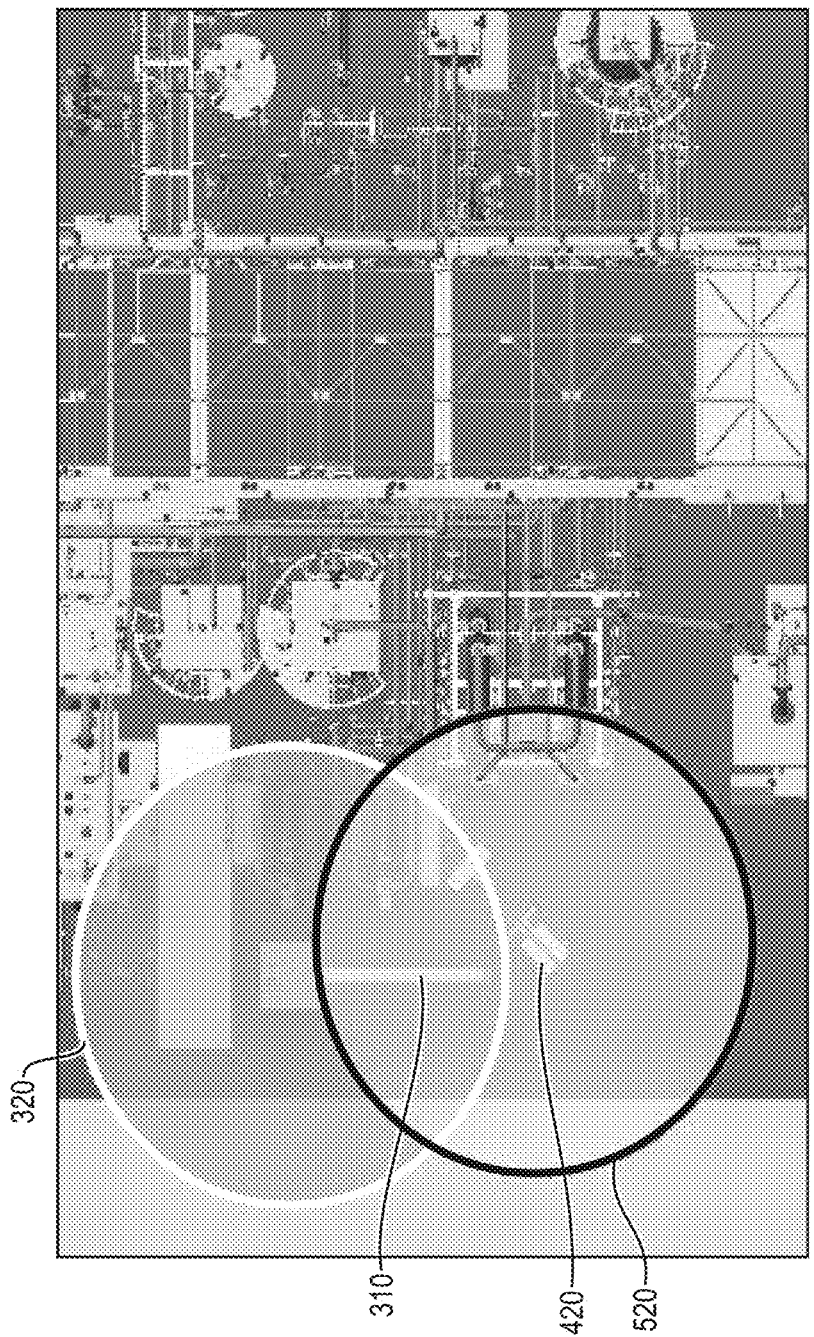
FIG. 5 is an overhead view for the embodiment of FIG. 4, providing a visualization of effective range (e.g., lifting radius) of the pieces of heavy equipment that may illustrate equipment-to-equipment support access reach.
Figure 6:
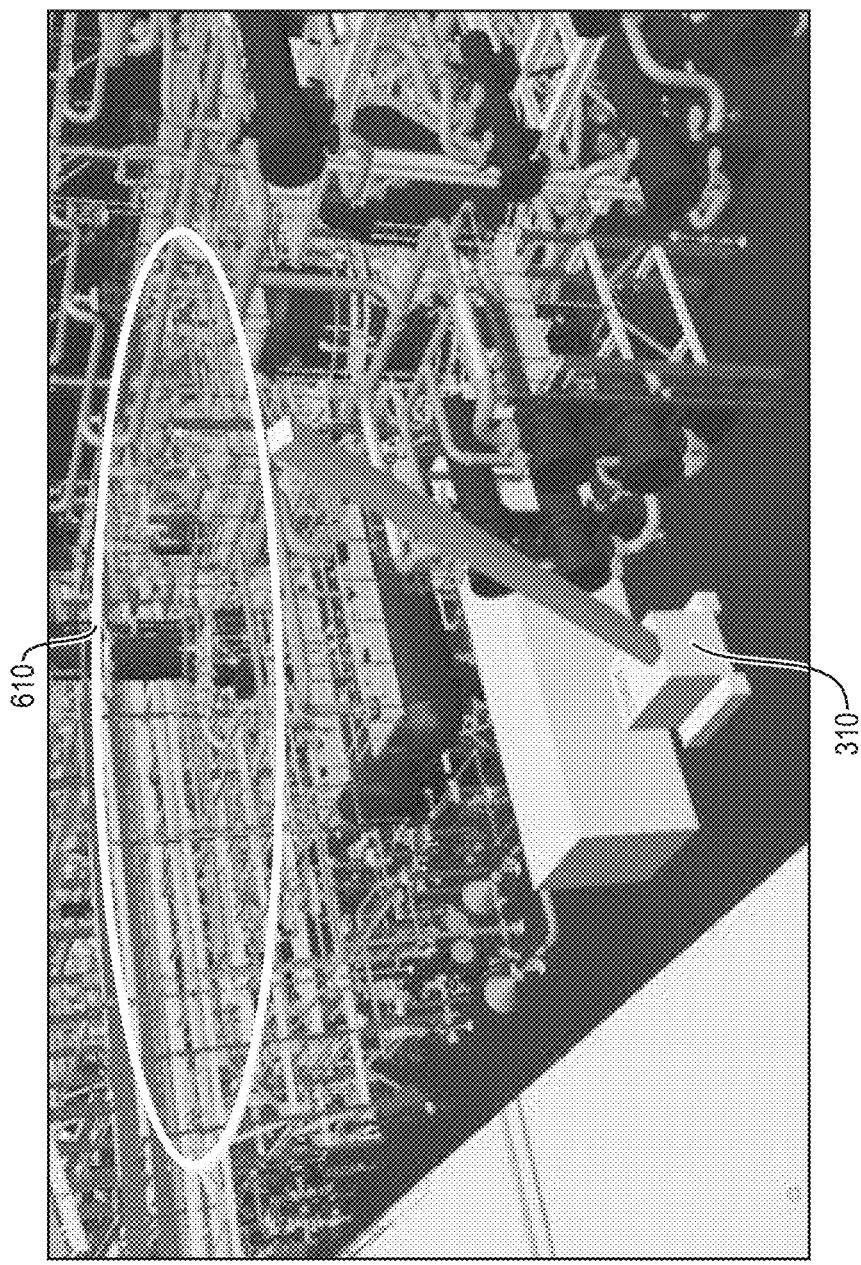
FIG. 6 is a perspective view for an embodiment involving a crane, providing a visualization of maximum capability (e.g., in the form of a "halo")
Figure 7:
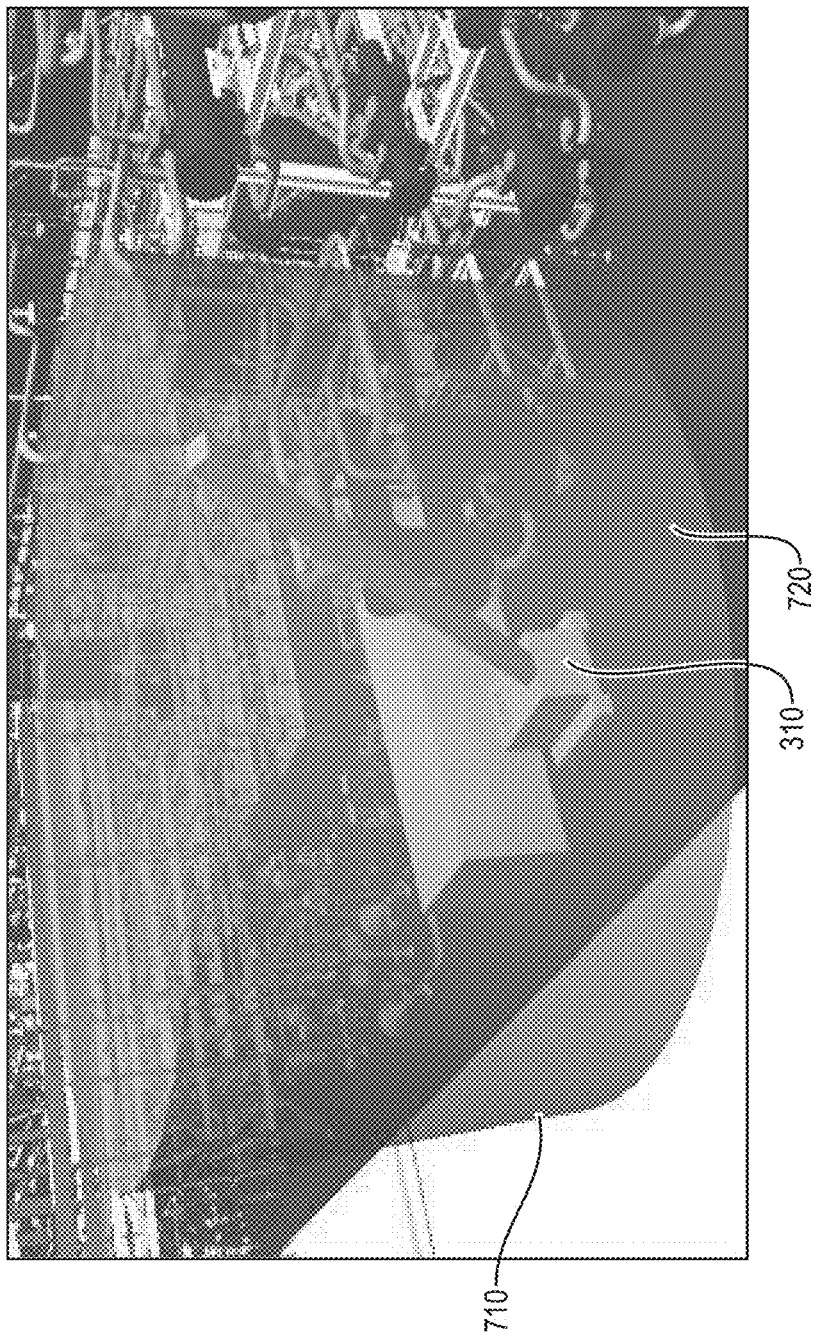
FIG. 7 is a perspective view for an embodiment involving a crane, providing a visualization of total travel path and debris.
Figure 8:
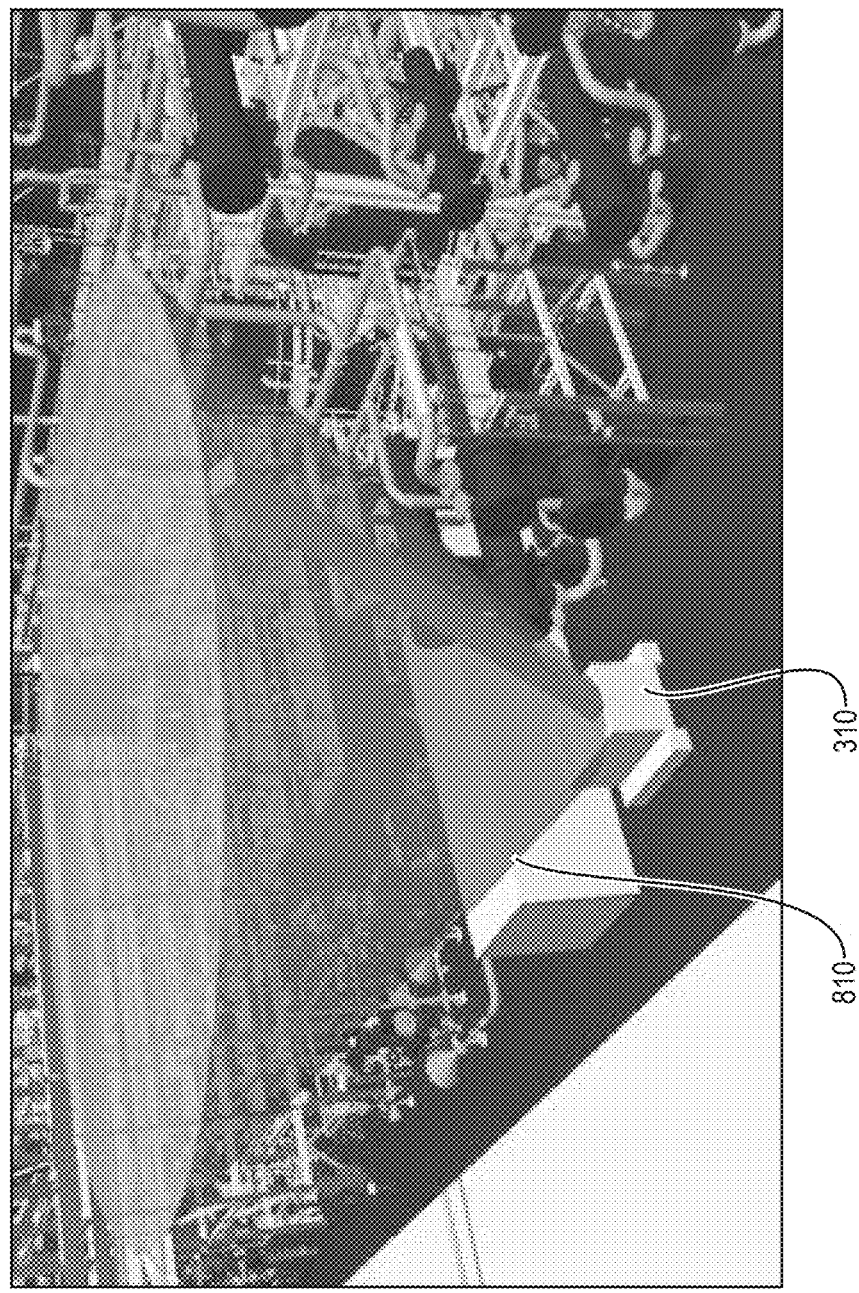
FIG. 8 is a perspective view for an embodiment involving a crane providing a visualization of a cone of equipment movement useful in clash detection.
Figure 9:
FIG. 9 is a blow up view of a portion of the perspective view of FIG. 8, further illustrating clash detection.

As discussed above, as part of step 235 the client 120 may display in its user interface a variety of views of the piece of heavy equipment in the 3D environment of the virtual construction model 154 that provide a variety of useful visualizations. FIG. 3 is an overhead view for an embodiment involving a crane 310 providing a visualization of effective range (e.g., lifting radius) 320 about a placement location 330 and the extent of work packages 340, 350. The view may also include indications of material lift stage points/material laydown areas 360 and access routes. FIG. 4 is a perspective view for an embodiment involving a crane 310 and an aerial work platform 420, providing a visualization of interaction among pieces of heavy equipment including those that access management. FIG. 5 is an overhead view for the embodiment of FIG. 4, providing a visualization of effective range (e.g., lifting radius) 320, 420 of the pieces of heavy equipment 310, 420 that may illustrate equipment-to-equipment support access reach. FIG. 6 is a perspective view for an embodiment involving a crane 310 providing a visualization of maximum capability (e.g., in the form of a "halo") 610. FIG. 7 is a perspective view for an embodiment involving a crane 310, providing a visualization of total travel path 710 and debris 720. FIG. 8 is a perspective view for an embodiment involving a crane 310, providing a visualization of a cone of equipment movement 810 useful in clash detection. Equipment movement may also be compared with material lift stage points/laydown areas 360 and personnel movement requirements using such a view. FIG. 9 is a blow up view of a portion of the perspective view of FIG. 8, illustrating looking inside the cone of equipment movement 810 to observe clashes with components or equipment disposed therein.

Figure 10:
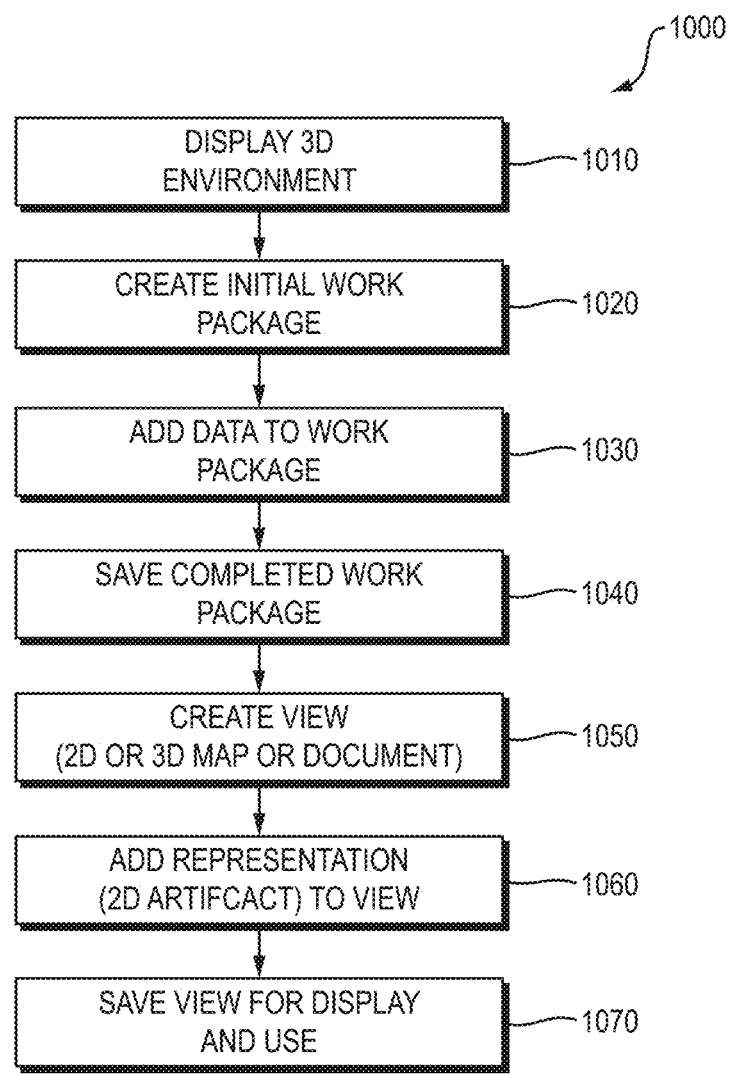
FIG. 10 is a flow diagram of a sequence of steps for creating a work package and adding a representation for the work package to a view.

Work packages that include pieces of heavy equipment and their operational details may be represented (e.g., as a 2D artifact) in a view (e.g., a 2D or 3D map or document) of an infrastructure project. In response to selecting such a representation (e.g., as a 2D artifact), details of the work package may be provided. FIG. 10 is a flow diagram of a sequence of steps 1000 for creating a work package and adding a representation for the work package to a view. At step 1010, a client 120 displays a 3D environment of the virtual construction model in its user interface. At step 1020, the client 120 creates an initial work package in response to user input, for example, the user selecting (e.g., drawing a box around or individually clicking on) components of interest in the 3D environment. At step 1030, the client 120 adds data to the work package and links the work package to other documents. Such information may include work scope, materials, labor and/or other type of data. At step 1040, the completed work package is saved. At step 1050, in response to user input in its user interface, the client 120 creates a view (e.g., a 2D or 3D map or document) of the infrastructure project. At step 1060, in response to user input indicating a location and identifying a work package, the client 120 adds a representation (e.g., as a 2D artifact) to the view. At step 1070, the view with the representation (e.g., 2D artifact) is saved for later display and use.

It should be understood that a wide variety of adaptations and modifications may be made to the techniques. Further, in general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for integrating heavy equipment into a virtual construction modeling workflow for an infrastructure project, comprising:
    adding, in response to input in a user interface of a client executing on a computing device, a representation of a piece of heavy equipment into a three-dimensional (3D) environment of a virtual construction model of the infrastructure project, the piece of heavy equipment having at least a unique identifier (ID), a placement location and an effective range;
    determining one or more work packages having an extent that falls within the effective range about the placement location;
    linking, by the client, the piece of heavy equipment to at least one of the one or more work packages by associating the unique ID with the work package;
    defining one or more operational details of the piece of heavy equipment to be implemented as part of the at least one work package; and
    providing the at least one work package to a work crew in the infrastructure project.

2. The method of claim 1, wherein the piece of heavy equipment is a crane or aerial work platform and the effective range is a lifting radius.

3. The method of claim 1, further comprising:
    adding in the 3D environment, in response to input in the user interface of the client, a description of one or more working zones;
    determining, by the client, one or more characteristics of components of infrastructure from the virtual construction model;
    based on the description of one or more working zones and the characteristics of components, suggesting, by the client, the piece of heavy equipment from a plurality of potential pieces of heavy equipment.

4. The method of claim 3, wherein the one or more working zones include a material lift stage point and a material lift to point, the one or more characteristics of components include a heaviest component weight, and the suggesting is based on a distance between the material lift stage point and the material lift to point and the heaviest component weight.

5. The method of claim 3, wherein the one or more characteristics of components include one or more component sizes, and the method further comprises:
    based on the one or more component sizes, adding in the 3D environment one or more volumes representing components manipulated by the piece of heavy equipment; and
    utilizing the volumes to detect clashes.

6. The method of claim 5, further comprising:
    providing, by the client in the 3D environment, a suggested area to use as the placement location, wherein the suggested area is based at least in part on detected clashes.

7. The method of claim 1, further comprising:
    utilizing at least the effective range and the placement location to detect clashes.

8. The method of claim 1, further comprising:
    providing a view of the piece of heavy equipment in the 3D environment of the virtual construction model that includes visualizations of capabilities of, or clashes caused by, the piece of heavy equipment.

9. The method of claim 1, further comprising
    loading, by the client, a 3D model of the piece of heavy equipment,
    wherein at least the effective range to the piece of heavy equipment is obtained from the 3D model.

10. The method of claim 1, further comprising:
    adding a representation of the work package to a view of the infrastructure project.

11. The method of claim 10, wherein the representation is a two-dimensional (2D) artifact and the view is a 2D or 3D map or document.

12. A computing device configured to integrate heavy equipment into a virtual construction modeling workflow for an infrastructure project, comprising:
    a processor; and
    a memory coupled to the processor and configured to store a client that is executable on the processor, the client when executed operable to:
        add a representation of a piece of heavy equipment into a three-dimensional (3D) environment of a virtual construction model of the infrastructure project, the piece of heavy equipment having at least a unique identifier (ID), a placement location and an effective range;
        determine one or more work packages having an extent that falls within the effective range about the placement location;
        link the piece of heavy equipment to at least one of the one or more work packages by associating the unique ID with the work package; and
        display the at least one work package.

13. The computing device of claim 12, wherein the piece of heavy equipment is a crane or aerial work platform and the effective range is a lifting radius.

14. The computing device of claim 12, wherein the client when executed is further operable to:
    add in the 3D environment a description of one or more working zones;
    determine one or more characteristics of components of infrastructure in the virtual construction model; and
    based on the description of one or more working zones and the characteristics of components, suggest the piece of heavy equipment from a plurality of potential pieces of heavy equipment.

15. The computing device of claim 14, wherein the one or more characteristics of components includes one or more component sizes and the client when executed is further operable to:
    based on the one or more component sizes, add in the 3D environment one or more volumes representing components manipulated by the piece of heavy equipment; and
    utilize the volumes to detect clashes.

16. The computing device of claim 12, wherein the client when executed is further operable to:
    add a representation of the work package to a view of the infrastructure project.

17. A non-transitory electronic device readable medium having instructions that when executed on one or more processors of one or more electronic devices are operable to:
- add a representation of a piece of heavy equipment into a three-dimensional (3D) environment of a virtual construction model of an infrastructure project, the piece of heavy equipment having at least a unique identifier (ID), a placement location and an effective range;
- determine one or more work packages having an extent that falls within the effective range about the placement location;
- link the piece of heavy equipment to at least one of the one or more work packages by associating the unique ID with the work package; and
- display the at least one work package.

18. The non-transitory electronic device readable medium of claim 17, wherein the piece of heavy equipment is a crane or aerial work platform and the effective range is a lifting radius.

19. The non-transitory electronic device readable medium of claim 17, further comprising instructions that when executed are operable to:
- add a representation of the work package to a view of the infrastructure project.

20. The non-transitory electronic device readable medium of claim 19, wherein the representation is a two-dimensional (2D) representation and the view is a 2D or 3D map or document.

* * * * *